June 9, 1925.

T. W. BLACK 1,541,471

STOCK WATERING APPARATUS

Filed Feb. 24, 1922

2 Sheets-Sheet 1

INVENTOR.
THOMAS W. BLACK.

BY

*Lockwood & Lockwood*

ATTORNEYS.

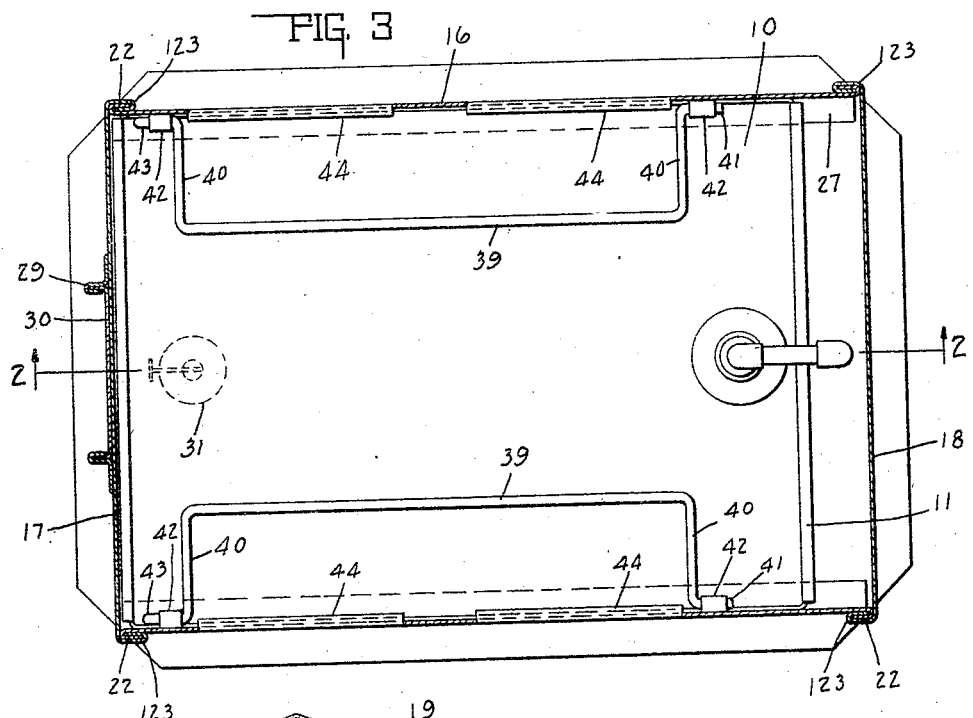

Patented June 9, 1925.

1,541,471

UNITED STATES PATENT OFFICE.

THOMAS W. BLACK, OF EATON, INDIANA.

STOCK-WATERING APPARATUS.

Application filed February 24, 1922. Serial No. 538,876.

*To all whom it may concern:*

Be it known that I, THOMAS W. BLACK, a citizen of the United States, and a resident of Eaton, county of Delaware, and State of Indiana, have invented a certain new and useful Stock-Watering Apparatus; and I do hereby declare that the following is a full, clear, and exact description thereof, reference being had to the accompanying drawings, in which like numerals refer to like parts.

This invention relates to a stock watering system, and the chief object of the invention is to provide means whereby water will be supplied to a trough or pan accessible to stock, and only a sufficient amount of water will be supplied to said pan to maintain a predetermined amount in said pan, which predetermined amount may be economically maintained in a liquid state during freezing weather.

Another one of the chief objects of the invention is to so construct the stock watering device that the same may be readily detachable into its several component parts so as to permit the same to shipped in a "knock down" condition.

The chief features of the invention consist in the provision of means for the accomplishment of both of the foregoing objects, and also in the provision of means for permitting access to a pan or trough by the stock, but preventing said stock from entirely entering the trough.

The full nature of the invention will be understood from the accompanying drawings and the following description and claims.

Figure 1:
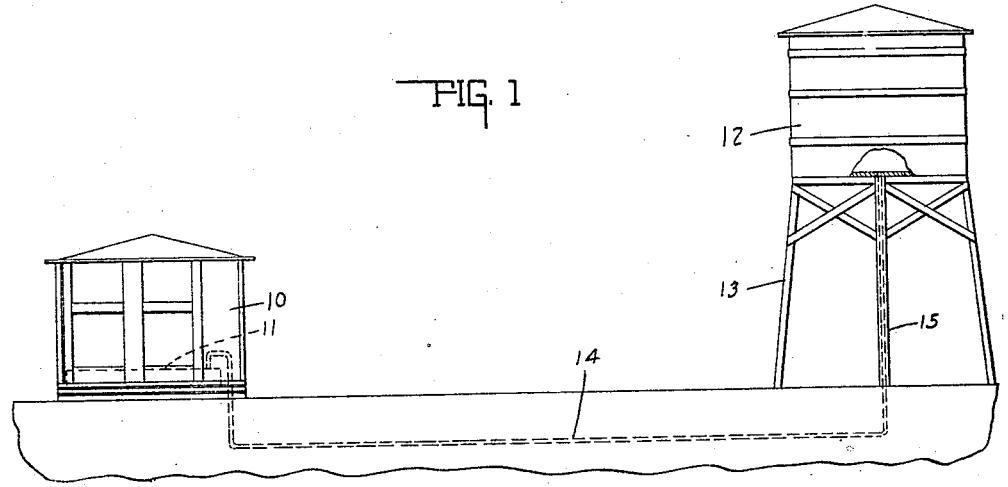
Figure 2:
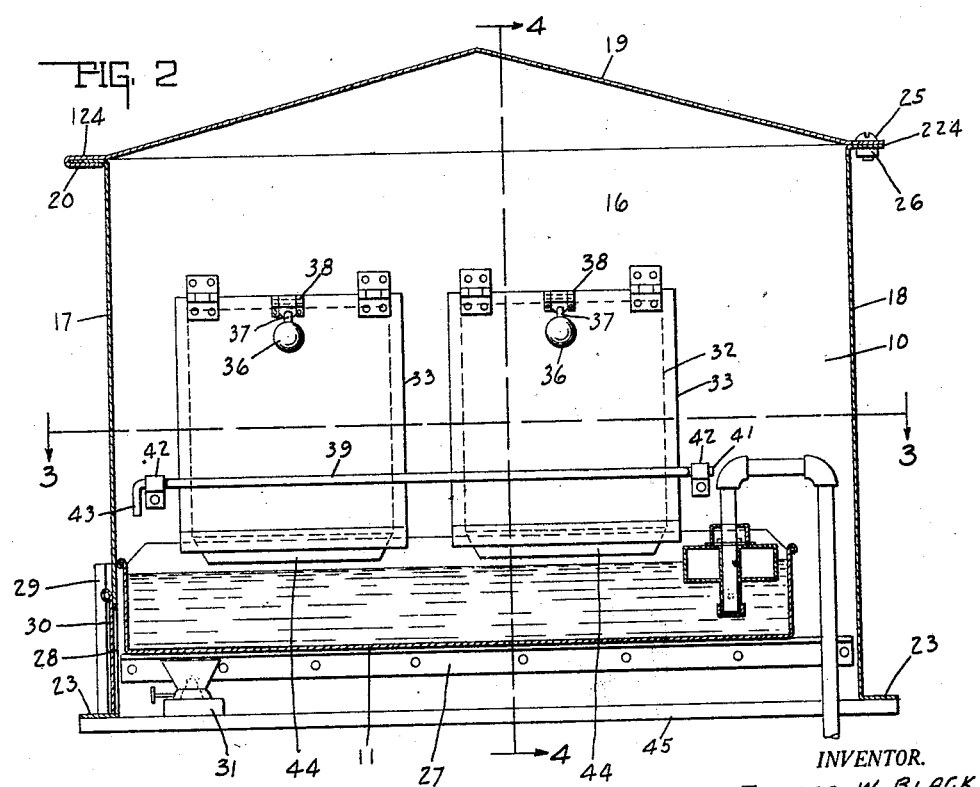

In the drawings, Fig. 1 is a side elevational view illustrating the apparatus utilized to accomplish the objects of the invention. Fig. 2 is a longitudinal section taken on the line 2—2 of Fig. 3 and in the direction of the arrows. Fig. 3 is a sectional plan view taken on the line 3—3 of Fig. 2 and in the direction of the arrows. Fig. 4 is a transverse sectional view taken on the line 4—4 of Fig. 2 and in the direction of the arrows. Fig. 5 is an enlarged side elevational view of the platform construction.

In the drawings 10 indicates in general the stock watering device, which includes a pan or trough 11. A main reservoir 12 is suitably elevated by the platform means 13 so as to have its outlet normally positioned above the level of the pan 11. A conduit 14 is connected to the central and lower portion of the main reservoir 12, inasmuch as the water adjacent this position is the last to freeze in the reservoir. Herein the pipe or conduit 14 is shown underground to prevent freezing. Likewise, the portion of the conduit 14 which connects the main reservoir to the buried portion of the pipe 14 is suitably protected, as at 15. The pipe 14, however, may be positioned upon the surface and also protected against freezing. The other end of the pipe 14 discharges into the pan or trough 11, and the rate of discharge is controlled by suitable float valve means; the details of construction of which are shown and described in the co-pending application, Serial No. 517,672, filed November 25, 1921. Any other automatic valve construction, however, may be substituted for that herein shown and referred to without departing from the broader features of the invention. By thus providing that the trough 11 shall only contain a small portion of water, and this supplied by the main reservoir 12, it will be understood that this small amount of water in the pan or trough 11 may be maintained in a liquid condition during freezing weather by a suitable heating means. Heretofore it has been the custom to heat the entire body of water, but by the aforesaid apparatus, it will be understood that only that portion of the water in the trough 11 is to be heated. In other words, the water is heated as used, and only the requisite amount of water is heated.

Reference will now be had to Figs. 2, 3 and 4 in particular wherein the details of construction of the stock watering device comprising the housing for the pan or trough is illustrated in detail. In said figures there is shown a rectangular housing; although the broader idea of the invention does not contemplate the restriction of the outline of said housing to be rectangular, for the same may be circular. Herein the housing comprises a pair of complementary, if not similar side walls 16, a pair of end walls 17 and 18 which may or may not be similar, and a top, cover or roof 19. All of these parts are detachably associated together in the manner hereinafter to be described; and when associated together are adapted to maintain in position the trough or pan 11.

Herein each side comprises a flat faced portion provided with an upper and outwardly extending flange 20 and a lower and outwardly extending flange 21. The vertical edges of the sides 16 are turned outwardly and back upon themselves to form a tongue or flange 22. Each of the ends 17 and 18 is provided with an outwardly extending flange 23 at the base portion thereof and an upper flange 24 at the upper edge thereof. Likewise, each of the ends 17 and 18 is provided with inwardly extending grooves 123 upon their vertical edges. The roof, top or cover is provided upon three sides with an inwardly extending flange 124 which forms a groove. Thus the two sides are secured together in spaced relation through the two ends, by means of the tongue and groove connections 123 and 22; and all of the four sides and ends are further secured in rigid relation by the cover 19, which upon three of its edges is provided with the groove forming flange 124 adapted to receive the upper outwardly extending tongues 24 and 20. The fourth edge of the roof is associated with the other outwardly extending flange 224, see Fig. 2, and both are suitably apertured to receive bolt means 25 with which is associated the nuts 26. From the foregoing it will be apparent that the sides, top and ends may be disassembled and placed in parallel relation for shipment in a knock down condition.

Each of the sides 16 is provided upon its inner side with a rail or flange support 27, and upon said flange support is positioned the trough or pan 11 hereinbefore described. It is to be understood that the trough or pan 11 is positioned in the rectangular housing when said housing is being assembled and before the last end and the roof have been positioned upon the two sides and the first end. The end 17 is provided with an opening 28, adjacent which is positioned a pair of groove constructions 29. The same may be formed, if desired, from the material and in the cutting of said opening. A suitable door 30 is slidably supported by the groove constructions 29 and permits access to the space beneath the pan 11 within the housing, and said space is adapted to receive any suitable form of heater or lamp 31. Thus only the liquid in the trough or pan 11 is maintained in a liquid state in freezing weather, by means of the heater. Likewise the frost exposable portion of the pipe 14 is enclosed within the heated housing 10 and is heated by the gases which pass along the bottom of the pan or trough 11 and discharge upwardly through the space surrounding said exposed pipe portion.

Reference will again be had to Figs. 2, 3 and 4 wherein the side construction is illustrated in detail. Each of the sides 16 is herein shown provided with a plurality of openings 32, and adjacent said openings and within the housing is pivotally supported a closure 33 having an offset portion or seat 34 and a curled edge 35. Each of the closures 33 is associated with a counterweight 36, which counterweight is provided with an angularly formed arm 37 and is also hingedly supported upon the closure 33 at 38, see Fig. 2. Fig. 2 illustrates the two operative positions of the counterweight 36; that in full lines on the left hand side illustrating the normally closed position of the counterweight, with the closure in the normally closed position. The position shown in the right hand portion of Fig. 4 illustrates the closure 33 in the open position, and the counterweight 36 in an upper position and bearing upon the closure 33. The dotted line position of the counterweight 36 shown in the left hand portion of Fig. 4 illustrates the position assumed by the weight 36 when the side 16 is in its "knock down" position.

The means for preventing the unlimited opening movement of the closure 33 consists of a bar 39 which is provided with a pair of supporting arms 40 and a hinge portion 41 which is hingedly supported in a bracket 42. One end of the hinge portion 41 is extended angularly thereof to form the angular extension 43, and this angular extension prevents the rod 39 from moving into the inoperative position when the closure 33 is moved into closed position by means of the counterweight 36. The limit means 39, as shown clearly by the dotted lines in Fig. 4, see the left hand side, shows that said limit means may be moved into a collapsed position adjacent the side wall 16 for transportation purposes.

The vertical edges of the opening 32 may be suitably protected or rounded by having a bead formed thereon, which may extend outwardly or inwardly. When the same extends inwardly, the closure 33 should be provided with an offset portion similar to the offset portion or seat 34. The opening 32 is protected at its lower edge by an inturned flange 44, and said inturned flange is adapted to cooperate with the ledge 27 so as to receive the upper edge of the sides of the pan 11, and thereby rigidly retain said pan between the side walls and at the same time protect the edge of said pan.

Associated with each of the lower flanges 23 of the ends 17 and 18 is a transverse strap 45 which extends beyond the sides 16 at 46 and the ends of said strap are bent angularly of said extensions 46 at 47. The upper end of said angular portion is bent downwardly at 48 to form a triangular construction, see Fig. 5, and said triangular construction forms a support for suitable planking 49 which may be secured thereto by any suitable means, such as the bolts 50. The planking 49 forms an approach platform for the stock, so that the young stock may approach the opening 32 and drink from the pan 11.

The invention claimed is:

1. A knock down device of the character described including a pair of side walls, a pair of end walls, a tongue and groove connection therebetween at each corner, outwardly projecting flanges on each wall, a cover therefor having a groove on three sides to receive said outwardly projecting flanges, and a cooperating flange upon the other side for locking all of said sides, cover and ends together in assembled relation by being secured to said remaining outwardly projecting flange, ledge means intermediate top and bottom upon two opposite walls and extending inwardly towards each other, and a base member supported by said ledge means, an opening in each of the ledge provided walls above the ledge means and defined by an inwardly and downwardly extending portion engaging said base member for retaining the same and forming a protection for the opening lower edge and the base member peripheral edge.

2. In a knock-down device of the character described, a side having an opening therein, a hinged closure for said opening, hinge means supported by said side adjacent the opening normally maintaining said closure in closed position but permitting forcible movement thereof, said means being tiltable into non-closing position adjacent the side for shipping purposes.

3. In a knock-down device of the character described, a side having an opening therein, a hinged closure for said opening, means hingedly supported by said side adjacent the opening and having a portion engaging said side for maintaining said means in position for normally limiting the opening movement of said closure, said means being tiltable into position adjacent said side for shipping purposes.

4. In a knock-down device of the character described, a side having an opening therein, a hinged closure for said opening, hinge means supported by said side adjacent the opening normally maintaining said closure in closed position but permitting forcible movement thereof, said means being tiltable into non-closing position adjacent the side for shipping purposes, means hingedly supported by said side adjacent the opening and having a portion engaging said side for maintaining said means in position for normally limiting the opening movement of said closure, said means being tiltable into position adjacent said side for shipping purposes.

5. In a stock watering device, the combination with a wall having a plurality of openings therein, a hingedly supported closure for each opening, means normally maintaining said closure in closed position but permitting forcible opening thereof by the stock, a common means for limiting the opening movement of said closures, a support on said wall beneath said openings, a trough positioned beneath said openings and supported by said support, and protective means for each of said openings and associated with a trough for retaining purposes.

In witness whereof, I have hereunto affixed my signature.

THOMAS W. BLACK.